Inventors
Arthur A. Bernard
Richard A. Bernard
By Mann, Brown & McWilliams
Attys

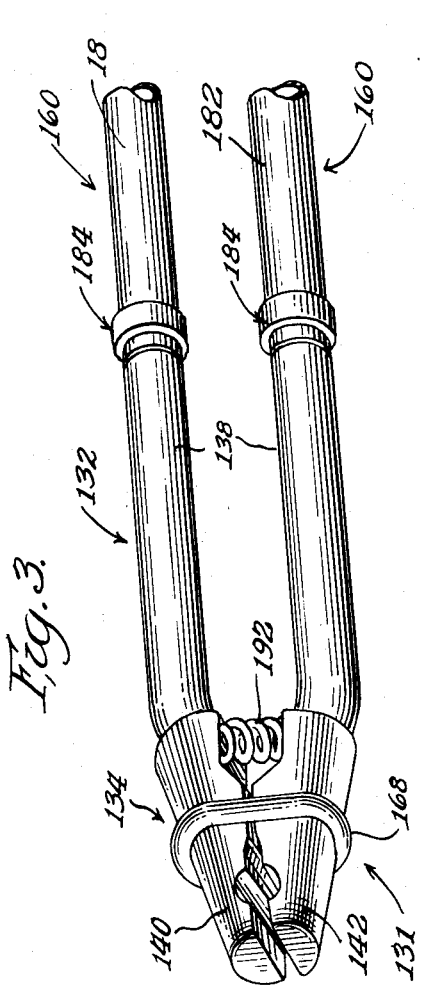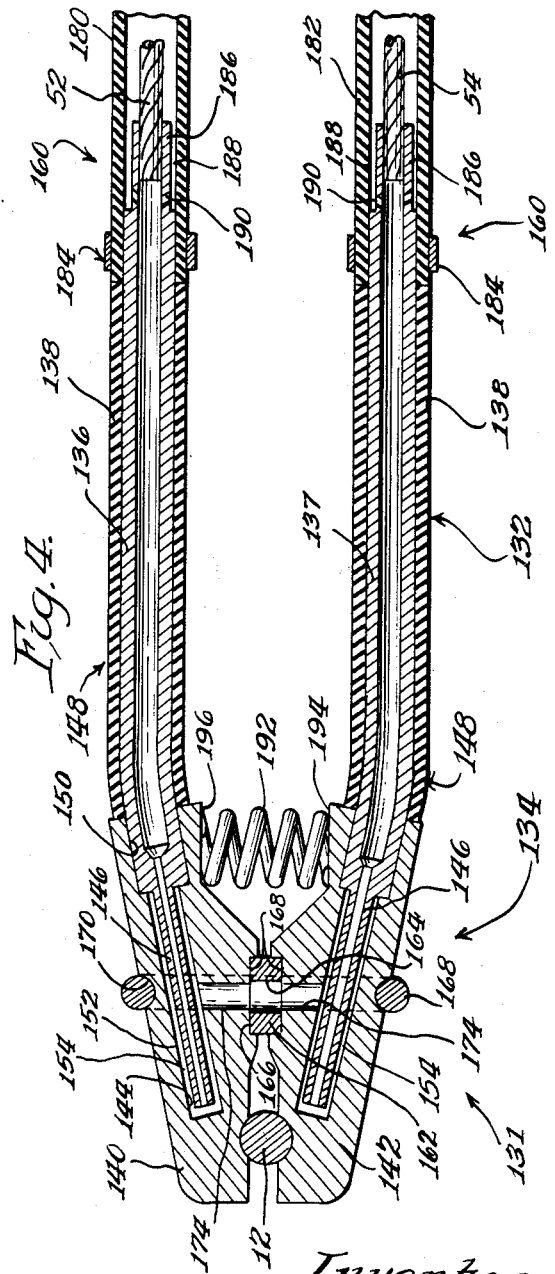

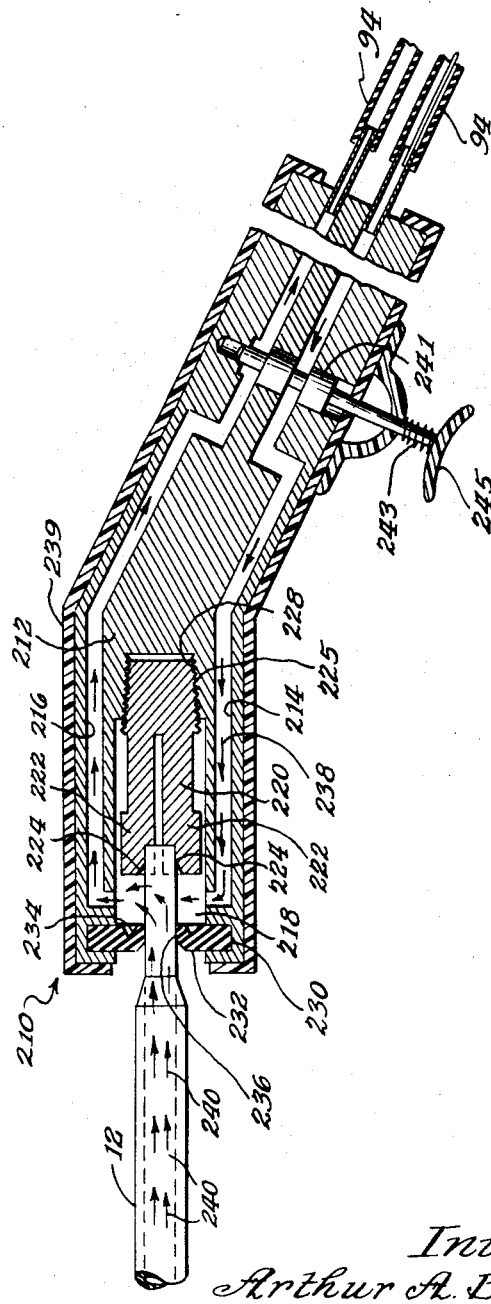

United States Patent Office 2,949,528
Patented Aug. 16, 1960

2,949,528
METHOD AND DEVICE FOR FLUX-COVERED ELECTRODE WELDING

Arthur A. Bernard, R.R. 2, and Richard A. Bernard, R.R. 1, both of Chicago Heights, Ill.

Filed Apr. 2, 1958, Ser. No. 726,001

4 Claims. (Cl. 219—138)

Our invention relates to arc welding, and more particularly, to the so-called flux-covered electrode welding process in which an electrode holder is employed to grip a flux-covered electrode for handling the latter during the welding procedure.

A typical electrode employed in this process may be 18 inches long and have a steel wire core that is ¼ of an inch in diameter, the core being covered with a coating of flux to the extent of about 17 inches of the electrode. In performing the process, the electrode is gripped by an appropriate form of electrode holder and applied to the work to strike an arc and convert the electrode into weld metal.

The time that it takes to melt the usable portion of a ¼ inch size type E–6020 flux-covered electrode when standard procedures are employed is approximately 1½ minutes when a current density of about 7200 amps. per square inch (or a welding current of about 360 amps.) is used. Tests have shown that electrodes of of this type and size, which weigh approximately 4½ ounces, provide approximately 3.5 ounces of weld metal, which amounts to about 8.8 pounds per hour based on a 100 percent arc time duty cycle.

In this art, economy requires that the electrode be melted and converted into weld metal at the highest possible rate. Regardless of the type and size of the electrode employed, the highest rate at which the electrode can be melted and converted into weld metal is governed by the maximum density of welding current which can be conducted through the electrode without excessive resistance heating the electrode before the total usable portion of it is consumed by the arc. Since the problem of effectively controlling resistance heat has heretofore not been solved, it has been necessary for the welding industry to spend untold thousands of dollars to develop substitute processes that produce the high welding rates that are so necessary in modern industry, and consequently the permissible welding rates of the flux-covered electrode process have remained the same for many years.

With regard to the flux-covered electrode process, each type and size electrode has a critical temperature beyond which it cannot be raised if maximum welding results are to be achieved, and the general practice used to establish what this critical temperature is for a particular type and size of electrode, is to continue to raise the current conducted through the welding electrode until it is resistance heated, in its upper portion adjacent to the electrode holder jaws, to be visibly red hot, or, about 1200° F., then to reduce the current to a point where there is not sufficient resistance heat produced to produce a visible red color, or, to alter the natural color of the flux coating. The safe current thus established is the maximum welding current recommended by the electrode manufacturer. No change in the coloring of the flux coating is generally a must because a change in color generally indicates a change in the chemistry of the flux, meaning, that if the electrode is resistance heated to too high a temperature, certain materials in the flux formula used to release a gas at the arc tip of the electrode to shield the welding operation from harmful ambient air are pre-released by the resistance heating of the electrode; it has definitely been established that if a portion of these gases are pre-released a low quality weld results. Also, a sudden high increase in the temperature of the electrode cracks the flux coating because the coatings are ceramic in nature and hence crack when heated suddenly as does porcelain and china and this cracked condition also affects weld quality because cracked portions of the flux fall off, leaving the surface of the electrode bare.

There is also another equally important factor which prohibits using a current density which excessively overheats the upper portion of the electrode before its total usable portion is consumed, and this factor is the control of uniform weld penetration, because if the electrode resistance heats to a red hot temperature before its usable portion is consumed, this preheated portion melts at a much faster rate and provides insufficient time for the arc to efficiently penetrate into the base metal welded.

One of the principal objects of the invention is the provision of a method for substantially reducing the resistance heat which normally develops in the upper usable portion of flux-covered arc welding electrodes by providing a heat sink through which the resistance heat developed in the electrode is drained from the electrode during the welding operation.

A further principal object of the invention is the provision of apparatus which prevents the resistance heat which normally develops at the contact between the electrode holder gripping jaws and the electrode from being conducted down into the usable portion of conventional flux-covered electrodes by maintaining a heat sink between this contact and a heat absorbing liquid circulated constantly through the electrode holder to drain the heat from this contact area.

A still further object of the invention is a method of keeping the upper portions of conventional flux-coated electrodes cool and by so doing maintaining a more efficient welding current conduction through the electrodes to deposit weld metal at higher than conventional rates of speed.

Another important object of this invention is to provide a flux-covered electrode process which substantially reduces the temperatures which otherwise are produced in the upper usable portion of conventional flux-covered electrodes and with this provision substantially reduce the volume of gas lost prematurely from the flux-coatings that are intended to be released at the arc for shielding the melted electrode metal from harmful ambient air.

Yet a further object of this invention is to provide a method for maintaining substantially lower temperatures throughout the total usable portion of conventional flux-coated electrodes as they are melted by the heat of the arc so that the melt-off rate of the electrodes is more uniform throughout their total usable portions and thus provide more uniform weld quality by maintaining more uniform weld penetration.

A most important object of this invention is to provide for the conduction of substantially higher current densities through conventional flux-coated electrodes than has been possible heretofore, that is, current densities capable of producing welding speeds in pounds of electrode deposited per unit of time which are from 25 to 75 percent higher than the speeds obtained with conventionally used current densities.

Our invention hereinafter described accomplishes these objects by providing a heat sink which drains heat out of the upper portion of the electrodes as the heat is generated by the resistance to the conduction of the welding current through the electrode, with the result that the electrode will conduct a substantial increase in current density without heating the electrode beyond the temperatures normally reached with conventional current densities. Our invention also accomplishes these objects by preventing the resistance heat, which develops at the contact between the jaws which grip the electrode and the electrode, from being conducted down into the upper portion of the electrode adjacent to the electrode gripping jaws, thus adding to the resistance heat which normally develops therein, which in turn also provides for the use of still higher welding current densities.

Other objects, uses and advantages will be obvious or become apparent upon a consideration of the following detailed description and the application drawings.

In the drawings:

Figure 3 is a diagrammatic perspective view of a different type of electrode holder embodying the principles of our invention;

Figure 4 is a longitudinal cross-sectional view through the holder of Figure 3; and Figure 5 is a diagrammatic cross-sectional view through the principal components of still a further type of electrode holder, showing an electrode applied thereto.

GENERAL DESCRIPTION

Figure 1:
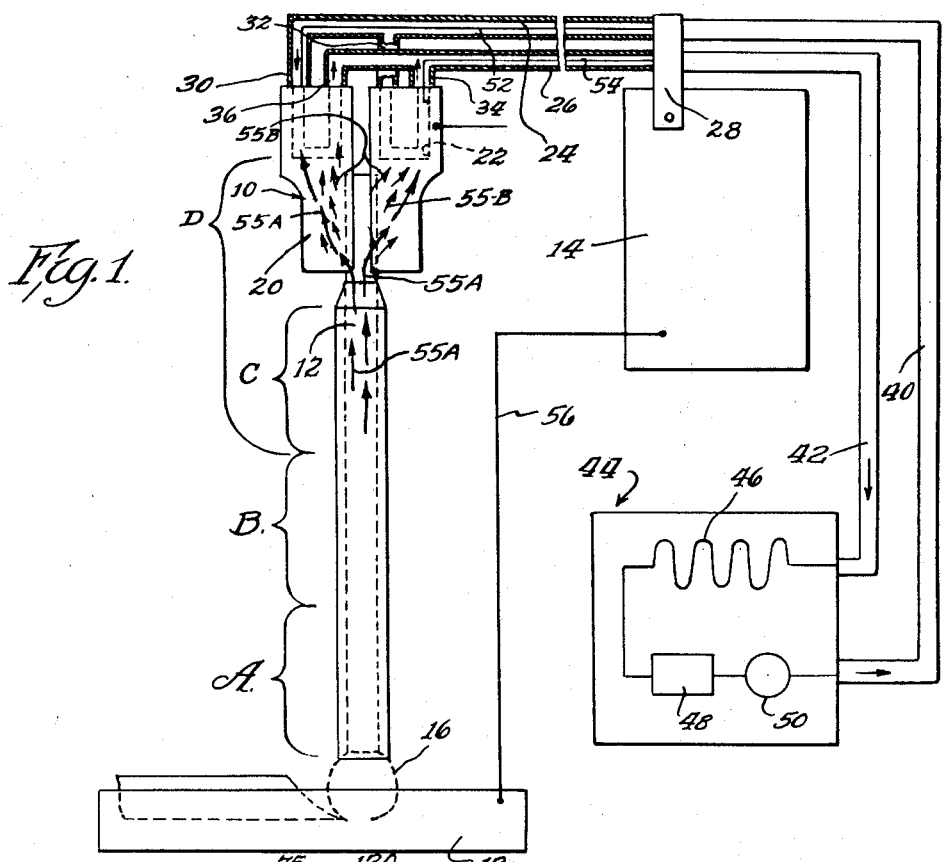
Figure 1 is a diagrammatic view illustrating the general principles of our invention.

Figure 1 diagrammatically illustrates the basic principles of our invention which primarily is a method for removing resistance heat from the electrode as the electrode is being consumed by the welding arc produced by the welding current which generates the resistance heat in the electrode. The resistance heat is removed from the electrode by providing what we prefer to call a "heat sink" represented in Figure 1 as being located within bracket D which is actually a high temperature gradient between the points approximately indicated by the ends of bracket D. The heat sink, which draws the resistance heat from the upper portion of the electrode is maintained constantly at a fixed level by circulating a low temperature heat absorbing liquid through the electrode holding means, thus providing a low heat level for the heat developed in the electrode to sink to and be carried away and disposed of by the circulated low temperature liquid. Reference numeral 10 generally indicates a pair of electrode holding jaws gripping a conventional flux-coated electrode 12 through which welding current, supplied by a conventional welding current machine 14, is conducted. Reference numeral 16 indicates the welding arc that has been struck between the electrode 12 and the work piece 18.

In accordance with our invention, the pair of electrode jaws 10 are employed to act as a portion of the heat sink represented by bracket D, the latter extending between the upper portion of the electrode indicated by bracket C to a circulated low temperature heat absorbing liquid. The heat sink induces the excess resistance heat that develops during application of high welding currents to flow, or be conducted, from section C to the circulated heat absorbing liquid which maintains the heat sink, thus removing the heat from the electrode as the heat develops. Assuming that the term temperature gradient means the difference in temperature between two points divided by the distance between these points, our invention contemplates the provision of a relatively high temperature gradient between the points approximately indicated by the ends of bracket D.

In the arrangement that is diagrammatically illustrated each jaw 20 of the pair of jaws 10 is formed with a coolant receiving channel or conduit 22, channels or conduits 22 preferably being as close as possible to the portions of jaws 20 that grip the electrode. Coolant supply conduit 24 and coolant return conduit 26 extend between a conventional adaptor 28 of the welding machine 14 and the jaws, supply conduit 24 including branches 30 and 32 that are connected to the intake ports of channels 22 and return conduit 26 including branches 34 and 36 that are respectively connected to the exhaust ports of channels 22. The coolant, such as water, is supplied to and removed from the adaptor by appropriate conduits 40 and 42, respectively, which may extend to an appropriate heat exchange device for removing the heat absorbed by the coolant, or inlet conduit 46 may be connected to an outlet from the municipal water system, or other source of water, and the conduit 42 connected to an appropriate drain. A preferred type of heat exchange device is that disclosed in the application of Richard A. Bernard, Serial No. 698,451, filed November 25, 1957 (the disclosure of which is hereby specifically incorporated by reference) which, as diagrammatically indicated at 44, includes one or more coils 46 through which the heated liquid is circulated to remove the heat. In the device of said application, a fan is employed to supply a large volume flow of air against the coils 46 to remove the heat therefrom. After passing through coils 46, the liquid enters the storage tank 48 from which it is drawn by an appropriate form of pump 50 and forced into coolant supply line 40.

We prefer to evenly divide between the jaws the welding current supplied to the electrode and in the diagrammatic showing of Figure 1, to achieve this object a welding cable 52 is shown extending between adaptor 28 through conduit 24 to one jaw 20 while a welding cable 54 is shown extending through conduit 26 from adaptor 28 to the other jaw 20. Lead 56 completes the circuit between the work piece 18 and the welding machine 14.

The heat gradient established must be such that the maximum temperature of the electrode is held below its critical temperature, which will range between 500 and 900° F. for different types of electrodes. Where a recirculated coolant system is employed, the temperature of the coolant entering the electrode holder should be held to a maximum of around 100° F. Water from a municipal system, well, lake, or other source will ordinarily be at a temperature that is well below that.

When an arrangement such as that diagrammatically illustrated in Figure 1 is employed, an electrode 12 of the 6020 type, ¼ inch in diameter and 18 inches long, can be deposited using 500 amperes of welding current, which is equivalent to a welding current density of 10,000 amps. This permits the electrode to be deposited in 66 seconds, instead of 1½ minutes and the 3.9 ounces of weld metal that are produced amounts to 13 pounds of weld metal per hour based on a 100 percent duty cycle thus providing an increase in efficiency of 48 percent over conventional practices employing a similar electrode. Based on a 60 percent duty cycle which allows 40 percent of total time for loading and unloading the electrode holders, the pounds of weld metal produced by employing our invention would amount to 60 percent of 13 pounds, or about 7.8 pounds as compared to 5¼ pounds (for a 60 percent duty cycle) when our improvements are not employed.

Where the cables 52 and 54 are employed inside conduits 24 and 26, they may be relatively small in diameter, as is well known in the art. However, when the welding current is conducted to the jaws 20 by welding cables that are not cooled in this manner, the cables should be size 350,000 c.m.; these cables are composed of a twisted mass of small copper wires having an overall diameter of .681 inch. Parenthetically, it may be mentioned that the core wire of a ¼ inch diameter size electrode is only about ½ the size of such cables, and its conductance is only a fraction of that of a copper conductor of the same size, so it should be clearly apparent why resistance heat develops when high welding currents are conducted through the electrode.

In fact, it is well known in the art that the flux-covered electrode process heretofore has been considered practical only because the electrodes are required to conduct the high current densities for only a short period of time. The instant that the arc is struck, the electrode starts to heat quite uniformly throughout its length by reason of its resistance to the conduction of the welding current, and each second during the depositing period the remaining portion heats to a higher and still higher degree.

Assuming that the total usable portion of the electrode 12 is melted and thus converted into weld metal in accordance with our invention, which is about 66 seconds if a ¼ inch size 6020 type electrode is consumed with a 10,000 ampere current density, then the first third A of the electrode (see Figure 1) is consumed in 22 seconds and hence a harmful degree of resistance heat does not develop in this first ⅓ portion of the electrode before it is consumed. Before the center third portion B of the electrode is consumed, the current flows through the top fraction of this middle ⅓ section for 44 seconds, and even with a current density of 10,000 amperes being conducted through this portion of the electrode a harmful temperature, that is, a temperature above that recommended by the electrode manufacturer, is not developed. However, with conventional practice and without this invention, if a current density of 10,000 amperes is conducted through the electrode, at the end of 44 seconds the top third portion C of the electrode becomes red hot and useless for welding purposes and would adversely affect the center portion B. Such is not the case, however, with this invention because during the 44 second period that the first and second ⅓ portions A and B are being melted, a large portion of the resistance heat developed in the top third portion C is removed from the core wire by being conducted back through the electrode gripping jaws 20 to the coolant which carries the heat away and disposes of it. It is because the temperature of the circulated coolant is much cooler than the jaws and the jaws being much cooler than the portion of the electrode which resistance heats that the heat sinks toward the cooled end of the electrode and through the jaws to the heat absorbing coolant. The phenomena of the conduction of heat out of the top portion of the electrode into the electrode gripping jaws and through the jaws into the circulated coolant and thus removed from the electrode by the coolant is indicated by the arrows 55A. Preferably, the electrode gripping jaws are composed of an alloy with a high copper content to provide the highest possible conductance for conducting the heat from the electrode to the circulated coolant.

It should be understood that the electrode illustrated in Figure 1 does not heat in the stages indicated by the brackets, which are used here only to describe the phenomena clearly. Actually, the rise in temperature along the length of the electrode is a progressive condition with the temperatures increasing quite proportionally to the time factor. The important thing to be considered is that if 500 amperes were conducted through a type E-6020 ¼ inch size electrode 18 inches long by the conventional method, at the end of 44 seconds the remaining third of the electrode, or about 6 inches of the 18 inch length, would be heated to a degree which would make the electrode useless for quality work.

Circulating the heat removing liquid through the current contact jaws 20 which grip the electrode 12 also removes heat which normally develops at another area, which if not also removed would further reduce the current density usable for depositing conventional flux-coated electrodes. Under normal conditions, the jaws which grip the end of an electrode are in contact with the surface of the electrode only at several small areas which seldom if ever, total the cross-sectional areas of the electrode; therefore, the resistance heat which develops at this contact can be as great as the resistance heat which develops further down into the electrode. With conventional practices, a large percentage of the resistance heat which develops at this contact is definitely conducted down into the electrode and adds to the resistance heat which develops therein. The present invention provides the reverse of this harmful condition, because the current contact jaws are kept cool and hence the cooled surfaces of the jaws absorb all of this heat and due to the temperature gradient the heat there generated, plus the resistance heat absorbed from within the electrode, is induced to flow through the jaw material toward the circulated coolant and be removed by the coolant which circulates constantly during the welding period, as indicated by arrows 55B.

In carrying out this invention, it is preferable that the coolant be circulated through the jaws as close as possible to the contact area where the electrode is gripped; however, the heat can be drained from the electrode at a more than ample rate for a considerable distance providing the material through which the heat flows to the circulated coolant is a material known to have a high heat conducting capacity, such as alloys containing high percentages of copper, or, aluminum, and providing also that the cross-sectional area of this material is ample for conducting the volume of heat involved and the temperature gradient is sufficiently high. For most efficient results, if the distance between the circulated coolant and where the electrode is gripped is 3½ inches, and if the material through which the heat flows to the coolant is an alloy containing not less than 90 percent copper, then the total cross-sectional area of the two jaws, or, the cross-sectional area of a single piece material, if used, should be not less than four times the cross-sectional area of the electrode from which heat is being drained. Also, the heat transfer area between the electrode jaws and the coolant, and the volume of coolant circulated should be sufficient to carry away the heat flow required to maintain the desired high temperature gradient.

As a matter of fact, this invention may be carried out with a holder of the type that permits installing of new jaws to replace jaws which become worn out, as the end of the jaw or jaws opposite the ends which grip the electrode may be threaded into such portion or portions of the electrode holder through which the coolant is circulated. However, the threaded connection, or connections, must be tight to insure efficient heat conduction therethrough.

SPECIFIC DESCRIPTION

Figure 2:
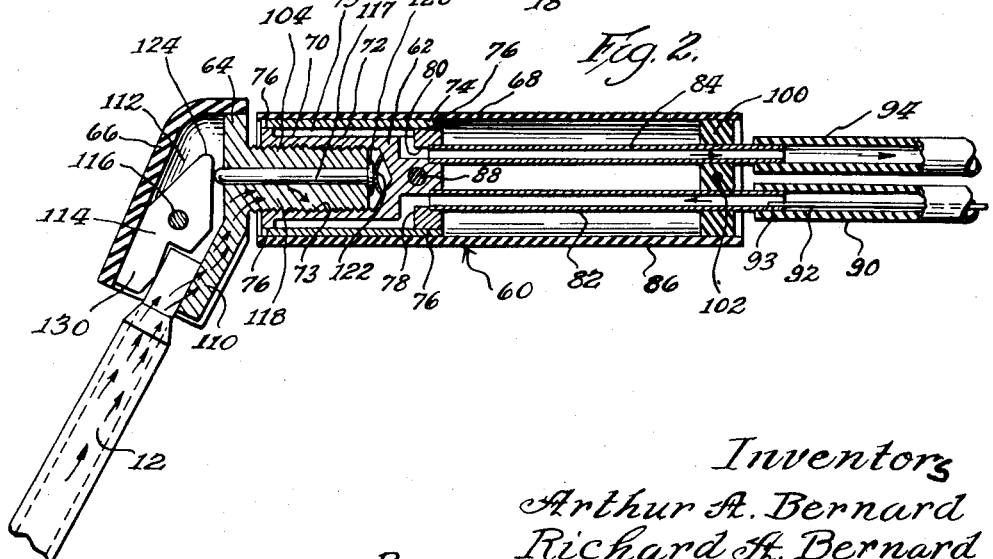
Figure 2 is a longitudinal cross-sectional view through a specific type of electrode holder to which the principles of our invention have been applied.

The illustration of Figure 1 is provided only for purposes of disclosing the general principles of our invention. While it is desirable that coolant be circulated through the jaws of the electrode holder themselves, this is not essential, as mentioned above and further illustrated by the specific embodiment of Figure 2. The electrode holder shown in Figure 2 is generally of the type described in Patent No. 2,364,508, issued to Arthur A. Bernard on December 5, 1944.

Reference numeral 60 generally indicates the holder in its entirety, which has been modified in accordance with the pirnciples of our invention, and which comprises a body portion 62, a head portion 64, an insulating hood or shield portion 66 insulating the head 64, and an insulating handle portion 68.

The body portion 62 in the illustrated embodiment is machined from a solid piece of copper alloy which is reduced as at 70 to form a generally annular recess 72 that extends a substantial portion of the length of the body portion and is bored and tapped as at 73 to receive the shank of head 64. A sleeve or tube 74, also formed from an appropriate copper alloy, is fixed about the body portion 62 to form the recess 72 into a generally annular channel 75. The tube or sleeve 74 may be silver soldered to the body where indicated at 76. The body portion 62 is formed with inlet and outlet passages 78 and 80 to which appropriate copper tubes 82 and 84 are respectively fixed in communication therewith as by silver soldering. The tubes 82 and 84 extend outwardly of a fiber insulating tube 86 that serves as the handle for the holder and which is anchored to the body by a fiber pin 88. A conventional form of coolant supply hose 90 is received over the end of tube 82, welding current supply cable 92 extending through hose 90 and silver soldered to the end of tube 82 as at 93 for supplying welding current to the holder. Coolant return hose 94 is received over the end of copper tube 84 and both tubes 90 and 94 lead to an apparatus such as that indicated at 14 and 44 in Figure 1. Tubes 82 and 84 may extend through insulating fiber disc 100 for bracing purposes, disc 100 being keyed to tube 86 by an appropriate fiber pin 102.

The head 64 is also formed from a copper alloy and comprises a screwthreaded shank portion 104 that is screwthreadedly received within the bore 73 that is formed in body portion 62. Shank 104 is integrally united with a U-shaped fixed jaw 110 that carries between its sides 112 a pivotally mounted jaw 114, which pivots about pin 116 that extends between sides 112. Pin 117 is slidably mounted within the passage 118 of shank 114 and includes a head 120 that bears against a spring steel resilient element 122. The other end of pin 117 bears against the inwardly extending end 124 of jaw 114. An electrode 12 is held between jaws 110 and 114 in the manner generally indicated in Figure 2 and as fully described in said patent, the electrode is released by twisting the head 64 so that it turns outwardly of body 62. The pressure of pin 117 on jaw 114 is then released which in turn releases the outer end 130 of jaw 114 from the electrode and permits the electrode to be withdrawn from the holder. The jaws are closed on a new electrode by twisting head 64 so that it turns inwardly of the body, which effects a counter-clockwise movement on jaw 114 by pin 117.

Assuming that the electrode 12 is applied to the holder 60 in the manner taught in said patent and cable 92 and hoses 90 and 94 are connected as described above, welding proceeds in the usual manner, and coolant is circulated through hoses 90 and 94, tubes 82 and 84, passages 78 and 80, and annular channel 75 during the welding cycle. As the heat starts to develop in the electrode after the arc has been struck, it flows through the electrode 12 approximately as indicated by the arrows into the fixed jaw 110 and through shank 104 into the body portion 62 from which it is carried off by the coolant medium, such as water, circulating through the electrode holder. Some heat is also conducted away from the electrode by the pivoted jaw 114 from which jaw the heat transfers to fixed jaw 110 and pin 117.

The embodiment shown in Figure 2 has proved to perform in accordance with all the principles of our invention mentioned above, and it indicates that it is not absolutely essential that the holder jaws themselves be cooled. As already indicated, we have found that the distance which the absorbed heat is conducted to the circulated coolant can be as great as 3½ inches providing the jaw material has a high capacity for conducting heat and is of ample cross-sectional area. Substances such as beryllium or chromium copper alloys may be employed for this purpose, which provide high strength as well as high heat and current conductivity.

It should be noted that the fixed jaw 110 and the threaded shank are relatively thick, while the wall 125 of the body 62 is relatively thin, which makes for a good transfer of heat from within the electrode to the coolant.

Figures 3 and 4 illustrate a different type of electrode holder embodying the principles of our invention. The holder 131 generally comprises a handle portion 132 and a head portion 134, and is adapted for incorporation in the coolant and electrical circuits illustrated in Figure 1. The handle portion 132 comprises a pair of copper tubes 136 and 137 (see Figure 4) each carrying an insulating jacket 138. The tube 136 is fixed in any suitable manner to a jaw 140 that is formed from an appropriate copper alloy while the tube 137 is fixed to a corresponding jaw 142 formed from a like material. We contemplate that the tubes 136 and 137 will be silver soldered to their respective jaws. The jaws may be cast or forged to approximately the shape shown in the drawings.

The jaws are each formed with a stepped diameter recess 144 in the embodiment that is illustrated, the recesses receiving reduced extensions 146 of the respective tubes 136 and 137. The tubes 136 and 137 are bent slightly as indicated at 148 and the larger portion of the respective bent ends are received in the enlarged portions 150 of the respective recesses 144. The reduced extensions 146 are received in the reduced diameter portions 152 of the respective recesses 144, extensions 146 being proportioned to define with the interior of the respective jaws the annular circulation channels 154.

Each tube and the jaw to which it is attached forms a lever 160 and the levers are pivoted to each other by being bound against a resilient tubular bushing 162 that is interposed between them. Bushing 162 may be formed from a material such as silicone rubber and is provided with hollow center 164 and relatively flat ends 166 that are seated in recesses 168 which are formed in each jaw. The jaws are pressed against the bushing 162 by rigid link 168 that is proportioned to be received in the respective grooves 170 that are formed in the respective jaws, when jaws are pressed together against bushing 162 in assemblying the holder. This may be done by a suitable type of bench vise or the like.

Link 168 is similar in shape to a chain link and is formed from an appropriate type of relatively strong metal or other suitable substance.

The jaws 140 and 142 are each formed with a passage 174 that is in communication with the hollow center 164 of bushing 162, whereby the recesses 144 of the jaws are placed in communication with each other.

The other ends of the tubes 136 and 137 may be attached to suitable coolant conveying tubes 180 and 182, respectively, the tubes 180 and 182 being held in place by an appropriate form of clamp generally indicated at 184. The cables 52 and 54 may be secured to the respective tubes 136 and 137 in the manner diagrammatically illustrated in Figure 4, or in any other suitable manner. As shown in Figure 4, the ends of the respective cables are silver soldered into a reduced end portion 186, the latter defining an annular channel 188 which leads to ports 190 formed in the end portion to provide access to the interior of the respective tubes.

An appropriate form of spring is preferably interposed between the levers 160 to bias the jaws 140 and 142 into engagement with the electrode 12. In the illustrated embodiment, helical compression spring 192 bears against spring seats 194 and 196, respectively.

The tubes 136 and 137 may be cut from straight lengths of tube and machined at both ends before being pressed into the shape shown. The extensions 146 are then filled into recesses 144 and silver soldered in place. Before clamping flexible hoses in place on tubes 136 and 137, the jackets 11 are fitted over tubes 136 and 137.

In operation, the levers 160 are pressed together at the handle portion 132 thereof to open the jaws 140 and 142 for insertion of an electrode 12. The jaws are then released sufficiently to permit spring 192 to bias the jaws against the electrode. The used electrode is dropped from the holder merely by pressing levers 160 together and a new electrode may be immediately inserted to continue welding.

The coolant is continuously circulated through tubes 180 and 182 in either direction, the coolant entering either tube 136 or 137 and proceeding thence to the jaw carried by it and its recess 144 after which it passes through the channels 174 and bushing 162 to the recess 144 of the other jaw and then out of the other handle forming a tube and back to the heat exchange device.

The embodiment of the invention shown in Figures 3 and 4, is considered novel for several reasons apart from the fact that it embodies our principles for draining heat from the electrode during welding. In the first place, the conventional rounded tubular handle is omitted in favor of the two levers 160 which are in effect pivotally connected together by link 168, though the bushing provides more of a forward and backward rocking motion than a hinge motion. Moreover, a welding current cable is connected to each of the tubular levers as is a coolant circulating hose. With this arrangement, the welding current is equally divided between the two electrode holder jaws and each of the jaws receives an equal amount of cooling medium.

Also, the outside diameter of insulating jackets 138 is the same size as that of hoses 180 and 182, thus presenting an unbroken streamlined appearance and continuous insulation from the jaws all the way back to the welding current source.

Preferably, the jaws of holder 131 are each proportioned to have a cross-sectional area that is at least two times the cross-sectional area of electrode 12. In the case of holder 60, it is essential that only the fixed jaw be so proportioned that it has a cross-sectional area that is approximately four times the cross-sectional area of electrode 12, since most of the heat is best conducted through it; however, the proportion of the heat conducting metal to the cross section of the electrode is approximately the same as in holder 131.

In the embodiment of 210 of Figure 5, the electrode 12 is cooled by direct immersion in the circulating coolant. Reference numeral 212 generally indicates a body portion which is formed with inlet passage 214 and outlet passage 216 that are connected to conduits such as those shown in Figure 2. Passages 214 and 216 communicate with chamber 218 in which is mounted collet member 220 provided with a pair of resilient jaws 222 formed as at 224 to grip electrode 12. The collet member is provided with a tapered screw threaded end 225 that is received in the correspondingly tapered and threaded bore 228 of body portion 212.

Body portion 212 is formed with an annular recess 230 in which is mounted a disc 232 formed from the rubber-like resilient material known as "neoprene." Disc 232 is formed with flexible circular lip 234 that defines an electrode receiving hole 236 which is smaller in diameter than the diameter of the electrode so that the electrode is sealingly gripped by disc 232.

The collet member 220 is preferably formed from a material such as a beryllium copper alloy so that the jaws 222 resiliently grip the electrode. The jaws 222 are preferably proportioned so that the electrode spreads them apart when it is inserted into chamber 218.

The material from which disc 232 is formed should be of a grade that will withstand relatively high temperatures, though when the coolant 238 is circulating, the temperature in the area of the disc will approximate that of the coolant.

The body portion 212 in practice is mounted in a suitable insulating handle member 239 and is connected to sources of coolant and welding current, for instance, in the same manner as shown in Figure 2. The electrode holder 210 may include a suitable valve 241 for closing off passages 214 and 216 when it is necessary to change the electrode. Valve 241 is only diagrammatically shown, and may include spring 243 to bias it outwardly and handle 245 by which it may be pressed inwardly to stop the flow of coolant.

In use, during welding, the coolant, such as water, is supplied to chamber 218 by passage 214 and circulates about the end of the electrode, the coolant leaving chamber 218 by passage 216, thus forming the aforementioned heat sink, and causing a heat flow that is indicated by arrows 240. The heat flowing from the electrode is transferred directly to the coolant which carries it away from the electrode holder. The electrode may be removed from holder 210 by pressing valve 241 closed to stop the flow of coolant and pulling the electrode from between jaws 222, while holding disc 232 uppermost to keep the coolant in chamber 218. A new electrode is then inserted through opening 236 of disc 232 and into the jaws, forcing them apart so that they will receive and grip the electrode. The valve 241 is then released for further welding.

ADVANTAGES

Many of the advantages of the invention have already been brought out. However, an extremely important advantage is that our invention makes the flux-coated electrode process the fastest of all known manually applied metal arc welding methods, and this includes all semi-automatic methods of the gun type gas shielded and submerged arc type. Thus, our invention so greatly improves the flux-coated electrode process that it now, when our invention is employed, will out-perform these more recent developments, which took untold thousands of dollars to produce.

Another advantage of the invention is that it is equally useful for depositing all of the many different types of flux-coated electrodes which total no less than a hundred, and, all sizes of the different types; therefore, all of these are at the disposal of the fabricator to choose from for handling the differential types of work and applications, and such a large selection of electrodes as this is not available for use with the semi-automatic methods, which generally are limited to 3 or 4 types. Another advantage somewhat parallel to the above is, that there are millions and millions of dollars invested in machinery and equipment used for manufacturing conventional flux-coated electrodes and now in that with this invention those electrodes can be deposited at speeds unequalled by the more recently developed semi-automatic methods, this manufacturing machinery and equipment will not become obsolete.

The table below shows the efficiency increase in depositing type E–6020 electrodes with this invention as compared with the conventional flux-covered electrode method. Note that the pounds of weld metal deposited per hour (based on a 100% arc time duty cycle) with this type electrode, shows an increase of 48% for the ¼ inch size, 51.3% increase for the 5⁄16 inch size and a 59.0% increase for the 3⁄8 inch size.

*Table I*

| Method Used | Electrode Size, inches | Welding Amperage | Lbs. Metal Deposited | Percent Increase |
|---|---|---|---|---|
| This invention | ¼ | 500 | 13.0 | 48.0 |
| Conventional | ¼ | 360 | 8.8 | |
| This invention | 5⁄16 | 665 | 16.4 | 51.3 |
| Conventional | 5⁄16 | 440 | 11.0 | |
| This invention | 3⁄8 | 790 | 23.3 | 59.0 |
| Conventional | 3⁄8 | 500 | 14.6 | |

As compared with the data shown in the above table, which represents actual test data, the electrode depositing rate with present day semi-automatic methods of the gun type gas-shielded and submerged-arc type is a maximum of 15 pounds per hour; therefore, the speed of converting E–6020 3⁄8 inch size electrode into weld metal with this invention is 62 percent faster than with semi-automatic methods. The E–6020 type electrodes, however, as compared with certain other types, are generally known as being only a medium speed type electrode.

The highest speed electrodes are the iron-powder E-6024 and E-6027 types and the higher speeds are obtained with these types because the iron powder contained in the flux coatings conduct welding current as does the core rod. With this invention, ¼ inch size type E-6024 and E-6027 electrodes produce weld metal at a speed of 24.1 pounds per hour when deposited with a welding current in the amount of 600 amperes, and with this invention the $5/16''$ sizes in these types produce 30.3 pounds of weld metal per hour when deposited with 750 amperes; therefore, these speeds are 60% and 100% faster than present day semi-automatic methods. Actually, this invention is more valuable for depositing these iron powder type electrodes than those types not containing iron powder in their flux coatings, because the current conducted by both the core rod and the iron powder must be conducted through only the core rod at the area where there is no flux coating adjacent to the jaws of the electrode holder; therefore, unless this invention is used for removing resistance heat from this area, much lower welding currents must be used for depositing these iron-powder type electrodes.

Another very important advanatge of the invention is that, although the invention is primarily for the purpose of removing heat from the electrode so as to provide the use of higher welding current densities which in turn make it possible to deposit flux-coated electrodes at speeds heretofore not possible, it also provides for the first time apparatus which can efficiently handle high welding currents and not become so excessively overheated to be impossible for the welding operator to handle. In conventional apparatus, a large portion of the heat developed in the electrodes is absorbed by the electrode holders. In fact, for the first three or four electrodes deposited, this is an advantage because the electrodes remain cooler; however, there is only a certain amount of heat that conventional electrode holders can absorb before they become too hot to be handled, and when they reach this unhandleable temperature they not only do not absorb heat from the electrodes, but rather start to transfer heat to the electrodes even before the arc is struck to start welding. Therefore, another advantage of this invention is that the heat drained from the electrode cannot heat the electrode holder because the removed heat is absorbed by the circulated coolant and not by the holder, and the heat absorbed by the coolant is carried away and disposed of.

The foregoing description and the drawings are given merely to explain and illustrate our invention and the invention is not to be limited thereto except insofar as the appended claims are so limited, since those skilled in the art who have our disclosure before them will be able to make modifications and variations therein without departing from the scope of the invention.

We claim:

1. An electrode holder comprising a pair of tubes, an electrode gripping jaw secured to like ends of each tube, said jaws each having a cross-sectional area that is at least two times the cross-sectional area of the electrode, each jaw being internally recessed for a substantial portion of its length, the recess of each jaw being in communication with the conduit formed by the tube to which the jaw is secured, a resilient tubular bushing interposed between said jaws, securing means binding said jaws together against said tubular bushing, said jaws each being formed with conduit extending between its said recess and said bushing, and resilient means biasing said jaws toward each other, whereby, coolant may be circulated from one tube to the other through said jaws to remove heat from the jaws during welding.

2. The holder set forth in claim 1 wherein said tubes are formed at least in part from a material having electrical conductance characteristics, and including a welding current cable secured to the other end of each tube.

3. In the consumable flux-covered electrode metal arc welding process employing a consumable flux-covered electrode held at one end thereof by a holder, the welding arc being struck between the other end of the electrode and the work piece, a holder therefor comprising jaw means for gripping said one end of the electrode, and means for continuously sufficiently cooling the gripped end of the electrode during the welding operation to maintain the temperature thereof below the critical temperature of the electrode, said holder further comprising a body portion formed with an encircling coolant circulation chamber, inlet and outlet conduit means in communication with said chamber, said body portion being formed with an internal recess that is encircled by said chamber, a head comprising a screw-threaded shank screwthreadedly mounted in said recess, said head including a first fixed jaw extending at an inclination therefrom, a second jaw pivoted between its ends to the first jaw, one end of said second jaw cooperating with said first jaw to grip said one end of said electrode, said jaws forming said jaw means, said fixed jaw defining heat and electrical current conducting path means extending from said one end of said electrode at least to said shank, said fixed jaw having a total cross-sectional area at the electrode contacting portion thereof that is on the order of four times the cross-sectional area of the electrode, said chamber, said conduit means and said path means comprising said cooling means.

4. In the consumable flux-covered electrode metal arc welding process employing a consumable flux-covered electrode held at one end thereof by a holder, the welding arc being struck between the other end of the electrode and the work piece, a holder therefore comprising a body portion having a chamber formed therein and closed by a sealing disc formed with a perforation, resilient jaw means mounted in said chamber, said jaw means releasably gripping said one end of the electrode, said one end of said electrode when applied to said jaw means extending through said sealing disc perforation, said disc sealingly engaging the electrode, and conduit means for circulating liquid coolant to and from said chamber and about said one end of the electrode, said chamber and said conduit means comprising means for sufficiently cooling the gripped end of the electrode to maintain the temperature thereof below the critical temperature of the electrode.

References Cited in the file of this patent

UNITED STATES PATENTS

| | | |
|---|---|---|
| 573,041 | Schindler | Dec. 15, 1896 |
| 1,306,746 | Campbell | June 17, 1919 |
| 1,618,383 | Lloyd | Feb. 22, 1927 |
| 1,756,556 | Hollup | Apr. 29, 1930 |
| 1,884,570 | Chapman | Oct. 25, 1932 |
| 2,080,791 | Sanders | May 18, 1937 |
| 2,350,614 | Jackson | June 6, 1944 |
| 2,352,939 | Cochrill et al. | July 4, 1944 |
| 2,364,508 | Bernard | Dec. 5, 1944 |
| 2,371,945 | Barbeck | Mar. 20, 1945 |
| 2,437,740 | Haynes | Mar. 16, 1948 |
| 2,448,396 | Schebler et al. | Aug. 31, 1948 |
| 2,475,594 | Danhier | July 12, 1949 |
| 2,554,236 | Bernard | May 22, 1951 |
| 2,726,310 | Brillie | Dec. 6, 1955 |